United States Patent [19]

Currier et al.

[11] Patent Number: 4,851,066
[45] Date of Patent: Jul. 25, 1989

[54] SNAP-SECURED BLADDER FOR AIR-DISTRIBUTION TERMINAL

[75] Inventors: Frederick A. Currier, Baldwinsville; Carl C. Herb, Camillus, both of N.Y.

[73] Assignee: Carrier Corporation, Syracuse, N.Y.

[21] Appl. No.: 562,547

[22] Filed: Dec. 19, 1983

[51] Int. Cl.[4] .............................................. F24F 13/06
[52] U.S. Cl. .................... 156/244.11; 156/66; 383/63; 98/41.1; 98/40.16; 251/61.1
[58] Field of Search ............. 92/34, 47, 89, 90, 91, 92/92, 98 R, 98 D, 99, 100, 101, 102, 103 R, 103 F, 103 SD; 277/212 FB, 221, 222, 228; 417/413; 251/61.1; 98/41 R, 40 D, 40 C; 383/63; 29/157.1; 156/244.11, 244.15

[56] References Cited

U.S. PATENT DOCUMENTS

| | | | |
|---|---|---|---|
| 3,002,499 | 10/1961 | Schultz | 92/99 X |
| 3,023,785 | 3/1962 | Russell | 92/99 |
| 3,030,252 | 4/1962 | Edgerly et al. | 92/103 F X |
| 3,120,192 | 2/1964 | Winchell | 92/34 X |
| 3,167,253 | 1/1965 | Church et al. | 236/80 R |
| 3,198,228 | 8/1965 | Naito | 383/65 |
| 3,495,502 | 2/1970 | Bousso | 92/34 X |
| 3,554,111 | 1/1971 | Traver et al. | 98/40.16 |
| 3,554,112 | 1/1971 | Herb | 98/40.16 |
| 3,837,267 | 9/1974 | Lambert | 98/40.14 |
| 3,844,868 | 10/1974 | Wentroble et al. | 156/281 |
| 3,867,980 | 2/1975 | Traver | 98/40.16 X |
| 4,033,732 | 7/1977 | Axelsson et al. | 251/61.1 X |

FOREIGN PATENT DOCUMENTS

| | | |
|---|---|---|
| 2226276 | 11/1974 | France . |
| 2315647 | 1/1977 | France . |
| 374863 | 3/1964 | Switzerland . |
| 1582104 | 12/1980 | United Kingdom . |
| 1585974 | 3/1981 | United Kingdom . |

OTHER PUBLICATIONS

UK patent appln. GB 2072571 filed Mar. 1981.

Primary Examiner—Robert E. Garrett
Assistant Examiner—George Kapsalas
Attorney, Agent, or Firm—David J. Zobkiw

[57] ABSTRACT

A bellows assembly is provided in which a retainer member is formed as an aluminum extrusion with two uniformly spaced recesses formed therein. A bellows is provided with two uniformly spaced attachment members which coact with the spaced recesses to provide a uniform bellows profile for its entire length. Accordion pleat members are provided to attach the ends of the bellows to the ends of the retainer member.

1 Claim, 2 Drawing Sheets

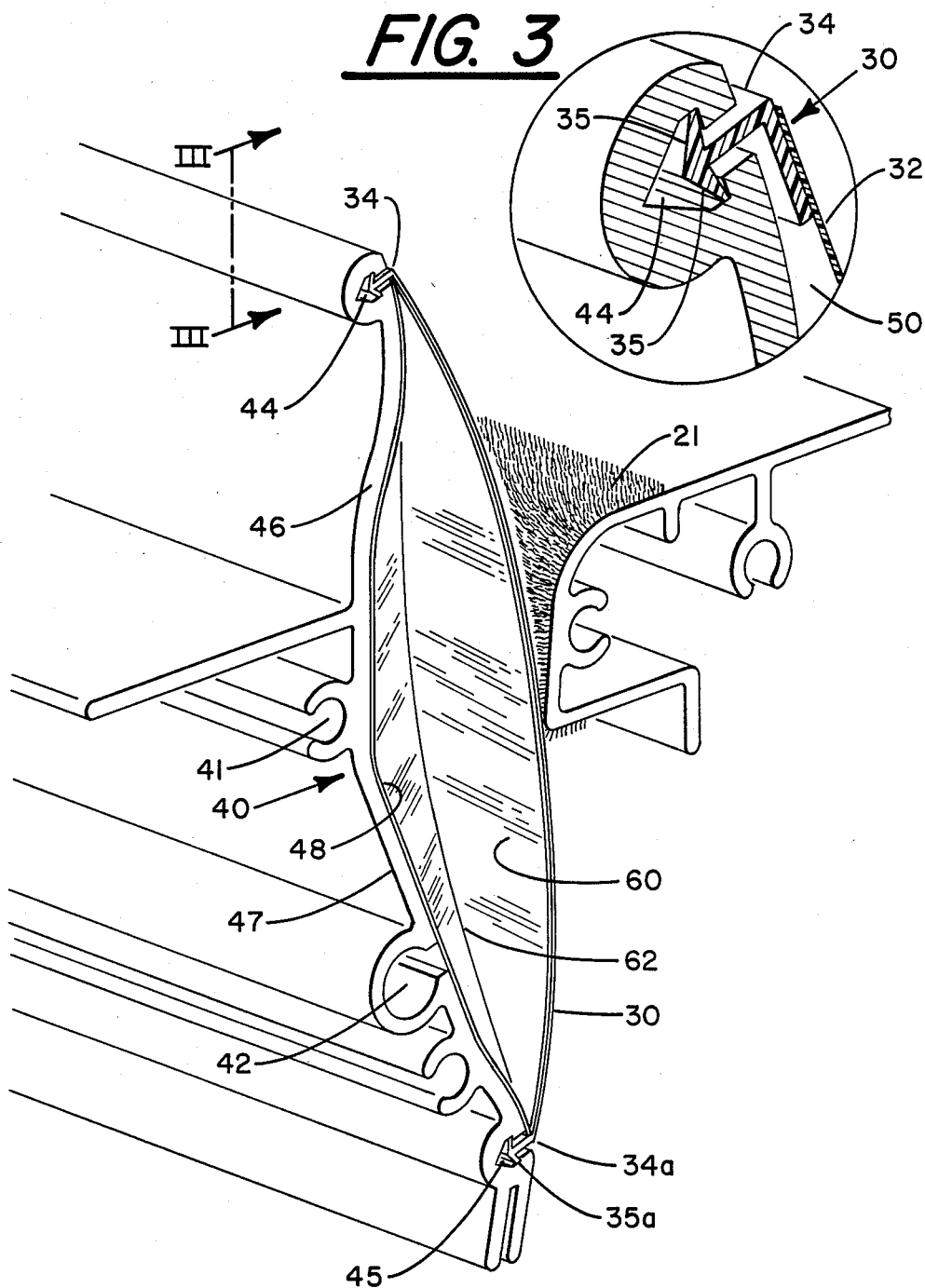

SNAP-SECURED BLADDER FOR AIR-DISTRIBUTION TERMINAL

BACKGROUND OF THE INVENTION

In a variable volume air distributing unit, a bellows or bladder damper is inflated by the air being supplied to the unit. The pressure of the air supplied to the bellows is controlled by a pressure regulator of a type well known in the art. The bellows coacts with a cutoff plate to define a slot whose width varies with bellows inflation. In a typical air distributing unit the slot would be 36 inches long and vary in width from 0 inches (fully closed) to 0.75-1.0 inches (fully open). For proper control, it is necessary that the slot width be uniform for its entire length to minimize noise problems, to have a uniform air flow and the correct volumetric flow.

The bladder or bellows structure for air distributing units has been made in various configurations and constructions.

In one embodiment the bellows is self-contained and glued in place on the support structure. In another embodiment the bellows is a single sheet that is glued about its edges to the support structure to define therewith an air chamber for inflating/flexing the bellows. As noted above, there is a need to have a uniform slot width and, when the bellows is glued in place, this imposes rigid requirements in manufacturing because the gluing procedure dictates how much of the bellows is not glued and therefore, free to flex upon inflation and deflation of the bellows assembly. Additionally, the gluing procedure dictates how uniform the gluing is on individual units as well as between units. Because of possible variations in the gluing procedure, it is often necessary to individually calibrate the bellows damper of each air distributing unit after they are installed.

SUMMARY OF THE INVENTION

The present invention is directed to a bellows assembly having a bellows or bladder which is snapped into place to seal and secure it along its major dimensions. The minor dimensions are glued or otherwise suitably secured in place in an accordian pleat type of arrangement. More specifically, the bellows assembly includes a polyurethane film member and a retainer which coact to form a pair of uniformly spaced seals running the full length of the film. The polyurethane film is made up of three members, a sheet and two extrusions, which have been heat sealed, welded, fused or otherwise suitably secured to form an integral unit. The ends of the film are preferably integral with polyurethane accordion pleat members which are, in turn, glued to the retainer.

It is an object of this invention to provide an inexpensive bellows requiring no calibration.

It is another object of this invention to provide a bellows assembly which reduces the pressure needed to achieve full flow at wide open condition.

It is a further object of this invention to provide a bellows assembly that is at least partially self-sealing.

It is another object of this invention to provide a bellows assembly that can be held to close tolerances in production and assembly.

It is an additional object of this invention to provide a method of making a bellows.

It is a still further object of this invention to provide a bellows assembly that can be grouped in multiples to produce units capable of delivering a greater fluid flow.

It is another object of this invention to provide a bellows assembly that is uniform along its entire length.

It is an additional object of this invention to provide a bellows assembly which is leak tight, readily assembled and dimensionally stable over the life of the unit.

It is a still furhter object of this invention to provide a bellows assembly whose assembled dimensional tolerance is small enough so that unit calibration is unnecessary. These objects, and others as will become apparent hereinafter, are accomplished by the present invention.

Basically, a bellows or bladder is formed from a film and two extrusions which are heat sealed together or otherwise suitably attached as by welding or fusing to form a single member. An extruded aluminum bellows retainer is provided with two recesses to coact with the two extrusions to form a fluid sealed attachment and to define a bellows chamber of a bellows assembly. The ends of the film are sealed to the retainer through members providing an accordion pleat arrangement in order to provide a uniform profile of the bellows, and thereby the slot, for its entire length. Preferably, the accordion pleat members are integral with the bellows.

BRIEF DESCRIPTION OF THE DRAWINGS

For a fuller understanding of the present invention, reference should now be made to the following detailed description thereof taken in conjunction with the accompanying drawings wherein:

FIG. 2 is a pictorial view of an end of the bellows assembly; and

FIG. 3 is a sectional view of the seal structure taken along line III—III of FIG. 2.

DESCRIPTION OF THE PREFERRED EMBODIMENT

Figure 1:
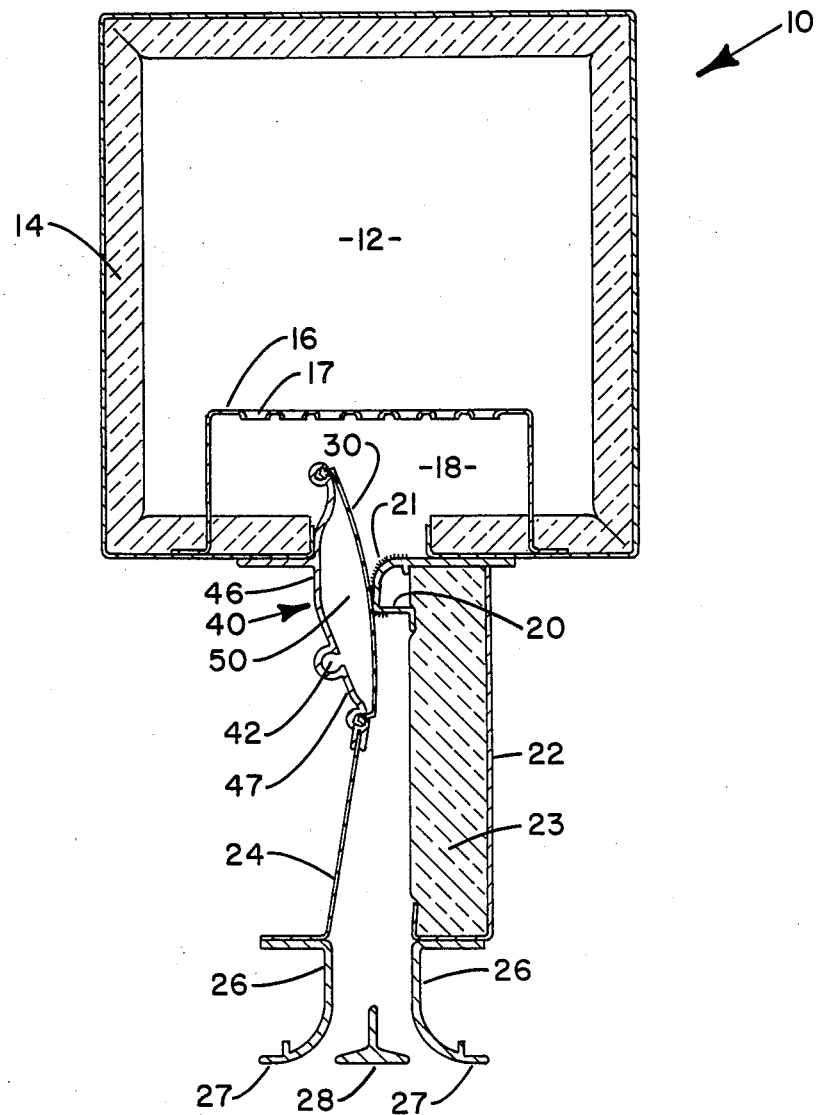
FIG. 1 is a sectional view of an air terminal employing the present invention.

In FIG. 1, the numeral 10 generally designates a ceiling air conditioning unit or terminal including a primary chamber 12 lined with a sound absorbing material 14 such as a glass fiber blanket. The primary chamber 12 is ordinarily open at both ends to permit the connecting of a series of terminals end to end to provide a complete air discharge system. Suitable end pieces (not illustrated) are utilized to cap the end terminals in the series. The terminals are connected to an air supply duct (not illustrated) which is provided to supply conditioned air to the air terminals located in rooms or areas in an enclosure. The conditioned air is treated in a central air conditioning apparatus (not illustrated). An air supply distribution plate 16, havig a plurality of collared openings 17 therein, is provided to evenly distribute the primary air supplied from chamber 12 into distribution chamber 18 which is defined by the top and side walls of distribution plate 16. To provide an optimum air discharge pattern, the air supplied to the distribution chamber 18 from the primary chamber 12 should have minimal non-vertical velocity components. The collars divert the horizontal velocity component of the air stream from primary chamber 12 so that the velocity components of the air stream in distribution chamber 18 are vertical.

The bottom of distribution chamber 18 includes a cut-off plate 20 which is provided with a felt lined curved surface 21 for quiet and resilient engagement by bellows or bladder 30 to form a damper or control chamber. The curved surface smooths the flow of air through the damper to minimize the pressure drop therethrough when bellows or bladder 30 is fully deflated and to minimize noise generated within the terminal over the entire operating range of the terminal. By varying the inflation/deflation of the bellows or bladder 30, the area of the opening between the bellows or bladder 30 and the cut-off plate 20 can be varied to regulate the quantity of air discharged into the area being conditioned.

As will be described in greater detail below, bellows or bladder 30 is mounted on retainer 40 which has a V-shaped recess therein so the bellows or bladder 30 is completely recessed within the retainer 40 when deflated. This provides a large area between the bellows or bladder 30 and cut-off plate 20 for maximum air flow therebetween. Further, the recessed bellows or bladder 30 provides a smooth surface to minimize air turbulence.

The damper mechanism is disposed a substantial distance upstream from the terminal outlet to provide substantial space therebetween to absorb any noise generated by the damper mechanism. For maximum sound absorption, downwardly extending wall 22 which forms an air passage in conjunction with member 24 is lined with a sound absorbing material such as glass fiber blanket 23. Outlet members 26, having outwardly flared lower portions 27, are affixed, as by clips or screw fasteners, to wall 22 and member 24, respectively. Diffuser member 28 is located midway between flared portions 27.

The chamber 50 which is defined between bellows or bladder 30 and retainer 40 is supplied with primary air through a passage (not illustrated) containing a pressure regulator and controlled by a bleed thermostat, as is well known in the art. In the present invention, the air passage to the chamber 50 includes recess 42 in retainer 40 which opens to chamber 50 along the full length of retainer 40.

Referring now to FIGS. 2 and 3, bellows or bladder 30 is made up of a polyurethane film 32 with two identical polyurethane extrusions 34 and 34a heat sealed, welded, fused or otherwise suitably secured thereto form an integral unit. The extrusions 34 and 34a are uniformly spaced over the full length of the film 32 and constitute male attachment members. The extrusions 34 and 34a, in cross section, are of an arrowhead or mushroom shape with flexible flared edges or barbs 35 and 35a respectively. The flared edges or barbs 35 and 35a form generally V-shaped fluid seals when received in corresponding mating recesses 44 and 45 which are located in retainer 40 and which constitute female attachment members. Retainer 40 is formed as an aluminum extrusion so that the dimensions, particularly the spacing between recesses 44 and 45, are held to close tolerances and the retainer structure is rigid. Similarly, the spacings of extrusions 34 and 34a are held to close tolerances when heat sealed, welded or fused to film 32. As a result, the profile of bellows or bladder 30 is uniform over its entire length since the spacing of the fixed points of the bellows or bladder is uniform.

Retainer 40, as noted above, defines a generally V-shaped recess, defined by arms 46 and 47 which meet along a line, located at 48, at an obtuse angle and form part of chamber 50. Retainer 40 is provided with a number of recesses such as 41 for securing the retainer 40 in place. Because retainer 40 is generally V-shaped, the separation between retainer 40 and bellows or bladder 30 can vary more with respect to line 48 than along the extrusions 34 and 34a. It is thus necessary that the ends of the bellows or bladder move more in the middle than at the edges of the ends of the bellows or bladder 30 in order to maintain a uniform slot width for the entire length of the bellows assembly. As best shown in FIG. 2, an accordion pleat member 60 is suitably attached to both retainer 40 and bellows or bladder 30 at each end thereof. Preferably member 60 is of the same material as bellows or bladder 30 and is fused thereto to form an integral unit with bellows or bladder 30. The member 60 is preferably glued to retainer 40. The accordion pleat member 60 flexes along line 62. However, the securing of extrusions 34 and 34a in recesses 44 and 45, respectively, holds the ends of the accordion pleat member 60 collapsed in all positions of the bellows 30. At intermediate points, however, the accordion pleat member 60 is able to flex along line 62 whatever amount is necessary for the ends of bellows or bladder 30 to be at the same position as the corresponding intermediate points of the bellows.

From the foregoing, it should be obvious that the spacings of recesses 44 and 45 as well as of extrusions 34 and 34a can be held to close tolerances by forming retainer 40 as an aluminum extrusion and by heat sealing, welding or fusing extrusions 34 and 34a to film 32 so that the response of the bellows or bladder 30, and therefore its coaction with cut-off plate 20 is uniform for the full length of bellows or bladder 30 between the ends. At the ends of the bellows 30, accordion pleat members 60 provide for the differential movement of the bellows or bladder 30 that is necessitated in conforming to the V-shaped recess formed in retainer 40.

In assembling the bellows assembly, extrusions 34 and 34a are forced into recesses 44 and 45, respectively, by causing the flexing or collapsing of flared edges or barbs 35 and 35a which snap back into shape upon entering recesses 44 and 45 as best shown in FIG. 3. The pressure in chamber 50, additionally, tends to hold the undersides of flared edge, or barbs 35 and 35a against the outer walls of recesses 44 and 45, respectively, to provide an additional sealing force. At the time of attachment of the bellows or bladder 30 to the retainer 40, the accordion members 60 are preferrably already suitably attached to bellows or bladder 30 but may be attached to retainer 40. After attachment of the bellows or bladder 30 to the retainer 40 the accordion members 60 would then be glued along their free edge to either the bellows or bladder 30 or retainer 40 as the case may be. This gluing takes place along a distance of about 4 inches as opposed to the 36 inches in a conventional attachment scheme. Additionally, the accordion pleat arrangement tends to compensate for any non-uniformity in the gluing procedure.

Although a preferred embodiment of the present invention has been illustrated and described, other changes will occur to those skilled in the art. For example, end plugs may be used in place of the accordion pleat arrangement such that the slot is always closed at the ends. Also, other materials such as Mylar may be used alone or in combination with other materials with the attachment procedure changing appropriately since, for example, only parts made of the same material can be fused. The male and female members can be reversed with the resilient member being the female member although a rounded configuration, in section, such as a ball and socket would be more appropriate in that case. It is therefore intended that the scope of the present invention is to be lmiited only by the scope of the appended claims.

What is claimed is:

1. A method for forming a bellows comprising the steps of:

extruding a first resiliently deformable attachment means;

extruding a second resiliently deformable attachment means;

sealingly attaching the first and second attachment means to a film at a uniform spacing;

attaching a pair of accordion pleat means to the film between the first and second attachment means.

* * * * *